US012671949B2

(12) United States Patent
Wakeland et al.

(10) Patent No.: US 12,671,949 B2
(45) Date of Patent: Jun. 30, 2026

(54) SYNCHRONIZED AUDIO STREAMING FROM MULTIPLE CONTROLLERS

(71) Applicant: ADVANCED MICRO DEVICES, INC., Santa Clara, CA (US)

(72) Inventors: Carl Kittredge Wakeland, Santa Clara, CA (US); Uma Sankara Rao Balla, Hyderabad (IN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 146 days.

(21) Appl. No.: 18/374,739

(22) Filed: Sep. 29, 2023

(65) Prior Publication Data

US 2025/0113153 A1 Apr. 3, 2025

(51) Int. Cl.
*H04S 3/00* (2006.01)
*G06F 3/16* (2006.01)

(52) U.S. Cl.
CPC .............. *H04S 3/008* (2013.01); *G06F 3/162* (2013.01); *H04S 2400/01* (2013.01)

(58) Field of Classification Search
CPC . G06F 3/16; G06F 3/165; G06F 3/167; G06F 13/4282; H04S 3/008; H04R 2499/13; H04H 20/18
See application file for complete search history.

(56) References Cited

U.S. PATENT DOCUMENTS 5,202,991 A 4/1993 Gamache
5,321,825 A 6/1994 Song 5,390,324 A 2/1995 Burckhartt et al.
5,611,042 A 3/1997 Lordi
5,729,472 A 3/1998 Seiffert et al.
5,987,628 A 11/1999 Von Bokern et al.
6,370,656 B1 4/2002 Olarig et al.
(Continued)

FOREIGN PATENT DOCUMENTS

CN 111683855 9/2020
KR 1020040010957 2/2004
(Continued)

OTHER PUBLICATIONS

U.S. Appl. No. 18/539,629, filed Dec. 14, 2023, listing Carl Kittredge Wakeland et al. as inventors, Entitled "Hardware Audio Modification System", 25 pages.
(Continued)

*Primary Examiner* — Jason R Kurr

(57) ABSTRACT

A processing system includes a hardware synchronizer to synchronize the transmission of audio data from multiple I2S controllers of a processing system to one or more audio codecs. In some embodiments, each of the I2S controllers receives audio data from one or more audio data sources and stores the audio data at a buffer associated with the controller. The hardware synchronizer initiates synchronized transmission of the audio data from the plurality of controllers to the one or more codecs in response to the buffer associated with each controller being filled to a predetermined level. In some embodiments, until the controllers begin transmission of the audio data, the controllers transmit mute (null) data to the one or more codecs such that the one or more codecs receives a frame start followed by null data for each frame.

20 Claims, 5 Drawing Sheets

(56) References Cited

U.S. PATENT DOCUMENTS

| | | | |
|---|---|---|---|
| 6,446,145 | B1 | 9/2002 | Har et al. |
| 6,584,587 | B1 | 6/2003 | McDermott |
| 6,640,268 | B1 | 10/2003 | Kumar |
| 7,426,644 | B1 | 9/2008 | Strongin et al. |
| 7,477,073 | B1 | 1/2009 | Tuan et al. |
| 8,824,692 | B2 | 9/2014 | Sheerin et al. |
| 9,122,476 | B2 | 9/2015 | Serebrin et al. |
| 9,411,688 | B1 | 8/2016 | Poolla et al. |
| 10,153,046 | B1 | 12/2018 | Agarwal et al. |
| 10,209,952 | B2* | 2/2019 | Tanaka .................... G06F 3/165 |
| 10,585,899 | B2 | 3/2020 | Usami et al. |
| 10,749,488 | B2 | 8/2020 | Quilter et al. |
| 11,496,577 | B2 | 11/2022 | Acharya et al. |
| 11,558,706 | B2 | 1/2023 | Lesso |
| 11,960,436 | B2* | 4/2024 | Ben-Amram ..... G06F 15/17325 |
| 2003/0115564 | A1 | 6/2003 | Chang et al. |
| 2008/0140957 | A1 | 6/2008 | Pattabiraman et al. |
| 2008/0147918 | A1* | 6/2008 | Hanebutte ............... G06F 13/28 |
| | | | 710/52 |
| 2008/0195902 | A1 | 8/2008 | Astigarraga et al. |
| 2008/0320366 | A1 | 12/2008 | Lin |
| 2009/0282393 | A1 | 11/2009 | Costa et al. |
| 2010/0125427 | A1 | 5/2010 | Gaiser et al. |
| 2010/0125444 | A1 | 5/2010 | Arya et al. |
| 2012/0054543 | A1 | 3/2012 | Dreier |
| 2013/0254586 | A1 | 9/2013 | Winger et al. |
| 2014/0095947 | A1 | 4/2014 | Mozak et al. |
| 2015/0019154 | A1 | 1/2015 | Usami et al. |
| 2015/0055406 | A1 | 2/2015 | Andre |
| 2016/0364343 | A1 | 12/2016 | Case et al. |
| 2019/0278733 | A1* | 9/2019 | Kessler .................. H04B 3/548 |
| 2021/0182132 | A1 | 6/2021 | Chen et al. |
| 2022/0013127 | A1 | 1/2022 | Goldstein et al. |
| 2022/0013149 | A1* | 1/2022 | Rentschler ............. H03K 19/20 |
| 2022/0121474 | A1 | 4/2022 | Brewer |
| 2023/0053582 | A1 | 2/2023 | Muralidharan et al. |
| 2023/0304266 | A1 | 9/2023 | Suzuki et al. |
| 2023/0350842 | A1* | 11/2023 | Ben-Amram ..... G06F 15/17337 |
| 2023/0370184 | A1* | 11/2023 | Robertson .............. H04H 20/88 |
| 2024/0281325 | A1 | 8/2024 | Arbel et al. |
| 2024/0406693 | A1 | 12/2024 | Veloso et al. |
| 2025/0091436 | A1 | 3/2025 | Enapakurthi et al. |

FOREIGN PATENT DOCUMENTS

| | | |
|---|---|---|
| KR | 10-2019-00955338 | 5/2019 |
| WO | 2022252063 | 12/2022 |

OTHER PUBLICATIONS

U.S. Appl. No. 18/617,112, filed Mar. 26, 2024, listing Uma Sankara Rao Balla et al. as inventors, Entitled "Shared Memory Freedom From Interference System", 49 pages.

U.S. Appl. No. 18/389,056, filed Nov. 13, 2023, listing Uma Sankara Rao Balla et al. as inventors, Entitled "Error Detection for Sram Used in a Safety-Critical Domain", 49 pages.

U.S. Appl. No. 18/375,294, filed Sep. 29, 2023, listing Andy Sung et al. as inventors, Entitled "Boot Ram for Safety Critical Domain", 24 pages.

U.S. Appl. No. 18/398,411, filed Dec. 28, 2023, listing Balatripura S. Chavali et al. as inventors, Entitled "Transactional Timeouts for Managing Critical Domains", 32 pages.

Non-Final Office Action mailed Dec. 18, 2024 for U.S. Appl. No. 18/389,056, 21 pages.

Non-Final Office Action mailed Mar. 13, 2025 for U.S. Appl. No. 18/375,294, 38 pages.

Final Office Action mailed Mar. 28, 2025 for U.S. Appl. No. 18/389,056, 42 pages.

Non-Final Office Action mailed May 30, 2025 for U.S. Appl. No. 18/398,411, 11 pages.

Non-Final Office Action mailed Jul. 3, 2025 for U.S. Appl. No. 18/389,056, 20 pages.

International Search Report and Written Opinion mailed Jun. 23, 2025 for PCT/US2025/019780, 10 pages.

International Search Report and Written Opinion issued in Application No. PCT/US2024/034054, mailed Oct. 8, 2024, 10 pages.

Non-Final Office Action mailed Oct. 28, 2025 for U.S. Appl. No. 18/539,629, 13 pages.

Non-Final Office Action mailed Sep. 30, 2025 for U.S. Appl. No. 18/617,112, 13 pages.

Final Office Action mailed Oct. 24, 2025 for U.S. Appl. No. 18/389,056, 22 pages.

Non-Final Office Action mailed Sep. 24, 2025 for U.S. Appl. No. 18/375,294, 8 pages.

Non-Final Office Action mailed Oct. 2, 2025 for U.S. Appl. No. 18/398,411, 11 pages.

* cited by examiner

100

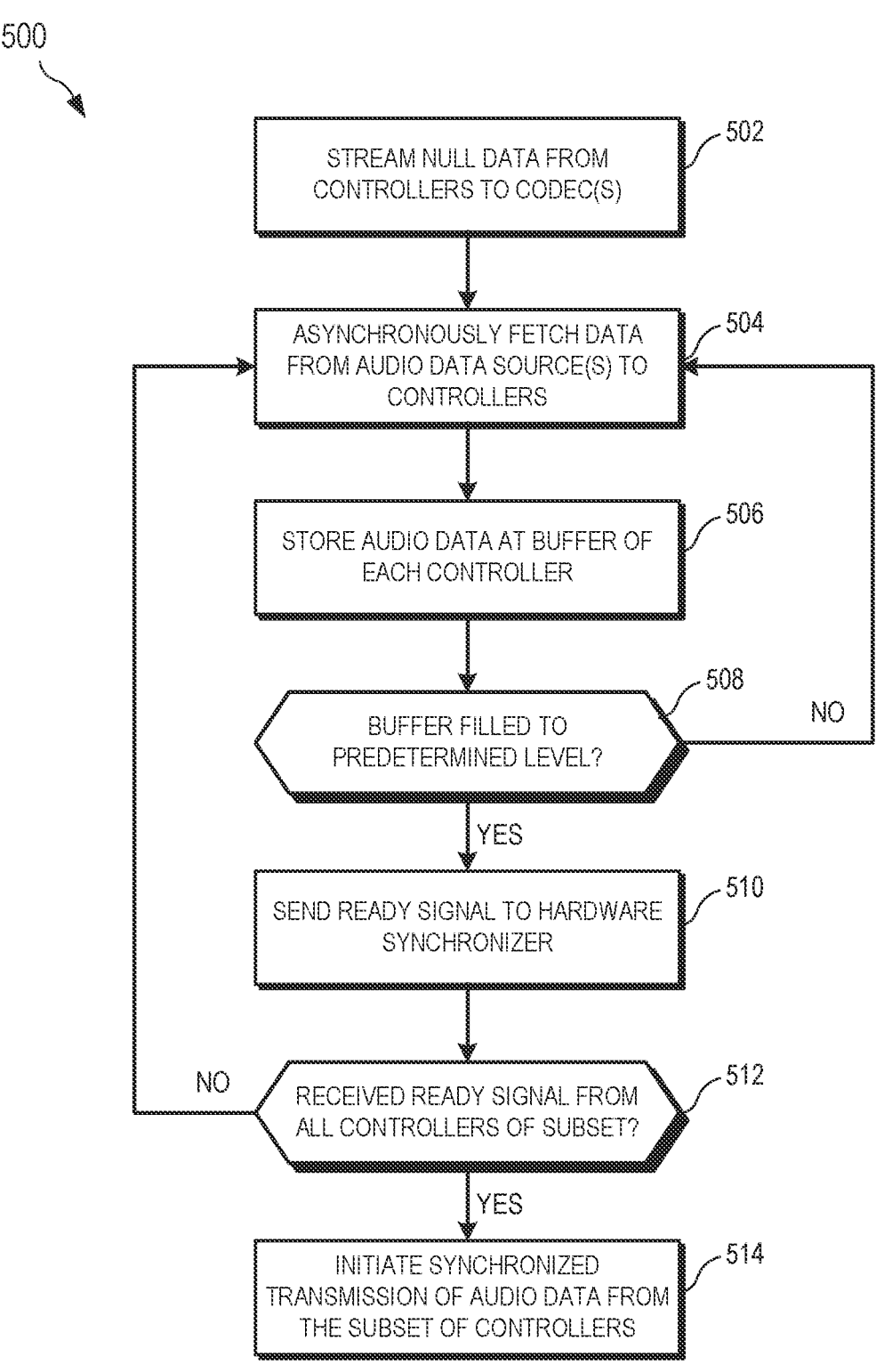

500

502 STREAM NULL DATA FROM CONTROLLERS TO CODEC(S)

504 ASYNCHRONOUSLY FETCH DATA FROM AUDIO DATA SOURCE(S) TO CONTROLLERS

506 STORE AUDIO DATA AT BUFFER OF EACH CONTROLLER

508 BUFFER FILLED TO PREDETERMINED LEVEL? — NO

YES

510 SEND READY SIGNAL TO HARDWARE SYNCHRONIZER

512 RECEIVED READY SIGNAL FROM ALL CONTROLLERS OF SUBSET? — NO

YES

514 INITIATE SYNCHRONIZED TRANSMISSION OF AUDIO DATA FROM THE SUBSET OF CONTROLLERS

FIG. 5

SYNCHRONIZED AUDIO STREAMING FROM MULTIPLE CONTROLLERS

BACKGROUND

Automobile sound systems typically include a system-on-a-chip (SOC) that outputs audio data from multiple channels. The audio data originates from multiple sources and is time division multiplexed in some applications for output to one or more internal devices of an electronic device. In some cases, a large set of channels is input to a single internal device such as a coder/decoder (codec). The audio data must be synchronized across the channels in order to produce a coherent audio output to the codec. In some cases, an automobile sound system uses Integrated Inter-chip Sound (I2S), which is a digital audio serial bus interface transmission standard used for connecting digital audio devices together. For example, I2S is used to communicate digital audio data, such as pulse-code modulation (PCM) audio data, between internal devices of an electronic device such as a codec, a digital signal processor (DSP), a digital-to-analog converter (DAC), an analog-to-digital convertor (ADC), a digital input/output interface, a digital filter, and the like.

I2S is a three-wire serial bus protocol that provides dual-channel data transfer between audio devices. Thus, for example, an eight channel audio data transfer requires four I2S serial lines. Time Division Multiplexing (TDM) is an interface that allows multiple channel audio data transfers over a single data line, thus increasing the amount of data that can be transmitted via a single line. Using TDM, audio data from multiple audio sources is multiplexed on a single data line in a time-sharing mode.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a flow diagram illustrating a method for synchronizing transmission of audio data from multiple controllers to one or more codecs in accordance with some embodiments.

DETAILED DESCRIPTION

Figure 1:
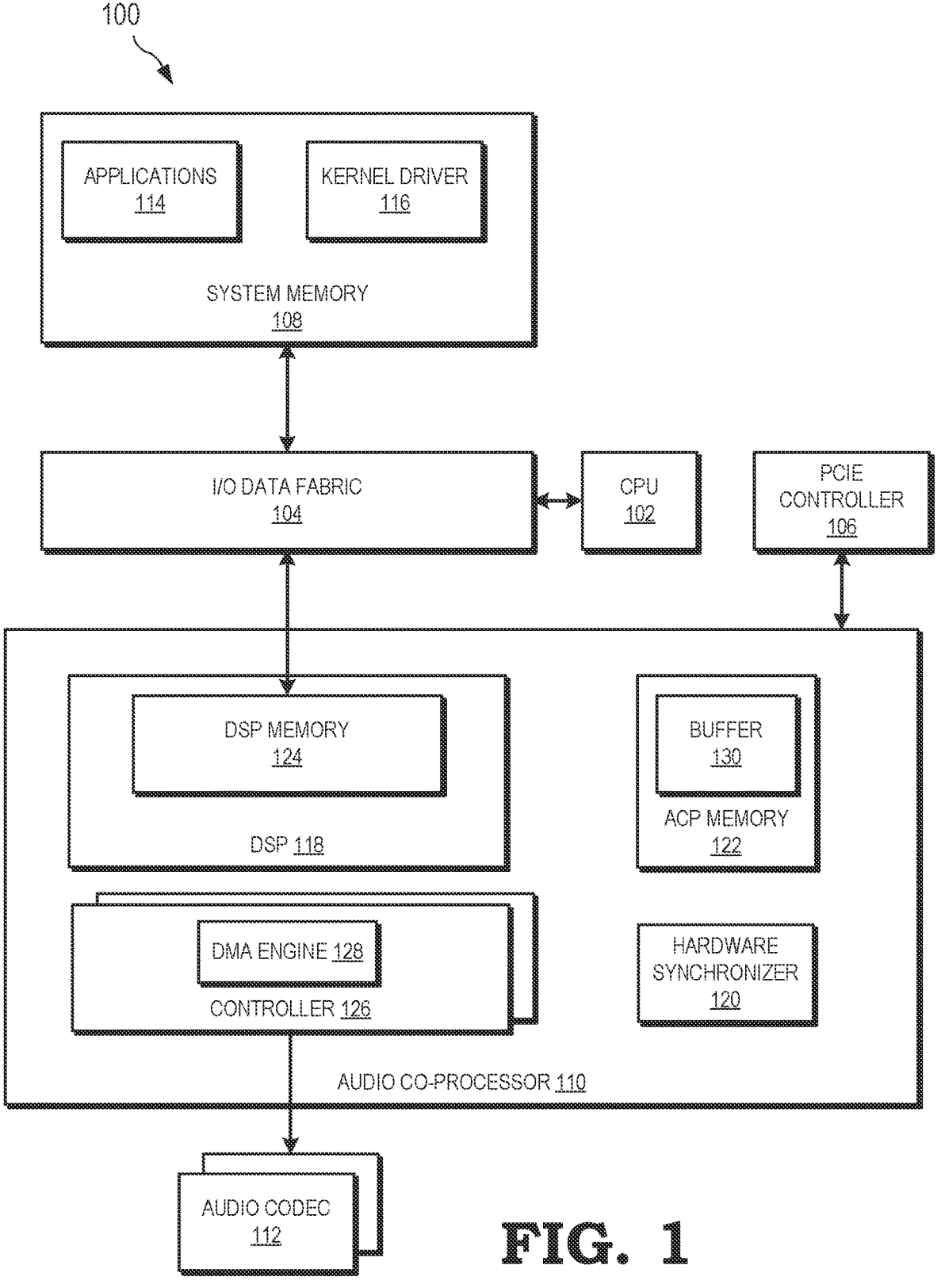
FIG. 1 is a block diagram of a processing system including a hardware synchronizer to synchronize audio data streams from multiple controllers to one or more codecs in accordance with some embodiments.

In the automotive context, a large set of audio channels is typically input to one or more audio interfaces such as a codec, which outputs a limited number of bits. In some cases, an audio system includes multiple I2S controllers that operate in a time division multiplexed (TDM) mode to transmit data to one or more devices such as a codec. Each controller carries multiple signals such as clock data, frame signal, data in, and data out, and includes several channels (e.g., 8 channels), with each channel carrying up to 32 bits of audio data. Further, each audio input may have multiple audio data streams, and each audio data stream may contain multiple channels. To have the proper audio output, all of the channels must be mixed and initiate streaming of audio data at the same time. Thus, audio data must be synchronized across the multiple I2S controllers.

FIGS. 1-5 illustrate techniques for synchronizing the transmission of audio data from multiple I2S controllers of a processing system to one or more codecs using a hardware synchronizer. In some embodiments, each of the I2S controllers receives audio data from one or more audio data sources and stores the audio data at a buffer associated with the controller. The hardware synchronizer initiates synchronized transmission of the audio data from the plurality of controllers to the codecs in response to the buffer associated with each controller being filled to a predetermined level. In some embodiments, until the controllers begin transmission of the audio data, the controllers transmit mute (null) data to the codecs such that each codec receives a frame start followed by null data for each frame.

In some embodiments, each of the controllers is associated with a direct memory access (DMA) engine that fetches the audio data to its respective controller asynchronously from the other DMA engines. Thus, the buffers associated with each of the controllers fill at different rates. Once its associated buffer is filled to the predetermined level, each controller sends a signal to the hardware synchronizer indicating that the buffer associated with the controller is filled to the predetermined level. In response to receiving the signal from each controller, the hardware synchronizer initiates the synchronized transmission of the audio data from the controllers to the codecs.

In some embodiments, the hardware synchronizer is programmed to synchronize audio streaming from only a subset of the controllers of the processing system. In such cases, the hardware synchronizer initiates synchronized audio streaming from the subset of controllers in response to receiving a signal from each controller of the subset indicating that the buffer associated with the controller is filled to the predetermined level. Once all of the controllers of the subset have indicated that their associated buffers are filled to the predetermined level, the hardware synchronizer enables the transmission of audio data from the subset of controllers to the codecs.

FIG. 1 is a block diagram of a processing system 100 including a hardware synchronizer 120 to synchronize audio data streams from multiple controllers to one or more codecs in accordance with some embodiments. In the example shown in FIG. 1, the processing system 100 is a system-on-chip (SoC) device capable of implementing one or more techniques described herein. The SoC device, in at least some implementations, is a component of the computing system 100 illustrated in FIG. 1 or is separate from the computing system 100. The processing system 100 is implemented as an SoC for the sake of example. However, in other implementations, any suitable computing device, such as the processing system of FIG. 1, a personal computer, server, smart phone, tablet computer, and so forth, are used. Such devices are implemented using either SoCs, discrete system components, or both in some implementations. It should be understood that FIG. 1 omits depiction of various components of the processing system 100 for clarity and ease of description. According to some embodiments, the processing system 100 is configured for one or more applications in an automobile, such as an automotive infotainment system. As an example, in some embodiments, the processing system 100 includes an audio co-processor for automobile applications.

In at least some implementations, the processing system 100 includes components such as a central processing unit (CPU) 102, an input/output (I/O) data fabric 104, a peripheral component interconnect enhanced (PCIe) controller 106, system memory 108, an audio co-processor (ACP) 110, audio codec 112, and the like. One or more of these and other components, in at least some implementations, are comprised of intellectual property (IP) blocks/cores, which are reusable units of logic, cells, or integrated circuit (IC) layouts.

The CPU 102, in at least some embodiments, is a CPU core complex that includes one or more suitable CPU cores. Each of the cores in a complex, in at least some implementations, includes a private cache and all of the cores in a complex are in communication with a shared cache. In at least some implementations, the processing system 100 includes a plurality of CPU core complexes. In at least some implementations, the CPU 102 is a parallel processor, such as any suitable parallel processor (e.g., graphics processing unit (GPU), machine learning (ML) application-specific integrated circuit (ASIC), etc.) or a combination of parallel processors. In other implementations, the processing system 100 includes one or more parallel processors (not shown) in addition to the CPU 102.

The data fabric 104, in at least one implementation, includes circuitry for providing communication interconnections among the various components of the processing system 100. Any suitable interconnection hardware is used in various implementations. In some implementations, from a physical standpoint, the data fabric 104 is implemented either in a central location of the processing system 100 or distributed to multiple hubs across the processing system 100 and interconnected using a suitable communications medium (e.g., a bus). From a logical standpoint, the data fabric 104 is located at the center of data flow, and information regarding the idleness of different components (including IP blocks) of the processing system 100 is concentrated (e.g., stored) in the data fabric 104.

The PCIe controller 106 is an example one type of I/O controller implemented by the processing system 100. The PCIe controller 106 includes circuitry for managing a PCIe interface between I/O devices and the I/O data fabric 104. Examples of other I/O controllers include a universal serial bus (USB), a non-volatile memory host controller interface (NVMe) bus, a serial advanced technology attachment (SATA) bus, a gigabit Ethernet (xGBE), a secure digital (SD) interface, a general-purpose input/output (GPIO) connection, a sensor fusion I/O connection, and or any other suitable I/O hardware.

A memory controller (not shown) manages access to system memory 108. For example, requests from the CPU 102 or other devices for reading from or for writing to system memory 108 are managed by the memory controller. In some embodiments, one or more applications 114 within the system memory 108 include various programs or commands to perform computations that are also executed at the CPU 102. The system memory 108, in at least some implementations, also includes an operating system (not shown) and kernel mode driver 116. The kernel mode driver 116 controls operation of the audio co-processor (ACP) 110 by, for example, providing an application programming interface (API) to software (e.g., applications 114) executing on the ACP 110 to access various functionality of the ACP 110. The kernel mode driver 116, in at least some embodiments, also includes a just-in-time compiler that compiles programs for execution by processing components of the ACP 110.

In at least some implementations, the system memory 108 includes non-persistent memory, such as dynamic random-access memory (not shown). In various embodiments, the system memory 108 stores processing logic instructions, constant values, variable values during execution of portions of applications or other processing logic, or other desired information. For example, in various embodiments, parts of control logic to perform one or more operations on CPU 102 reside within system memory 108 during execution of the respective portions of the operation by CPU 102. During execution, respective applications, operating system functions, processing logic commands, and system software reside in system memory 108. Control logic commands that are fundamental to operating system generally reside in system memory 108 during execution. In some embodiments, other software commands (e.g., a set of instructions or commands used to implement a device driver) also reside in system memory 108 during execution of the processing system 100.

The audio co-processor 110, in at least some implementations, is a dedicated co-processor device configured to perform calculations on audio data. In at least some implementations, the audio co-processor 110 includes a digital signal processor (DSP) 118, a plurality of controllers 126 such as I2S controllers or TDM controllers, and memory 122 (e.g., dynamic random-access memory (DRAM) or any other suitable type or memory). It should be understood that additional components of the audio co-processor 110 have been omitted for clarity and ease of description. Also, in at least some implementations, the ACP memory 122 is part of or replaced by one or more of the system memory 108, or the DSP memory 124. The ACP memory 122, in at least some implementations, includes one or more buffers 130 for the controllers 126. In other implementations, the one or more buffers 130 are included in the respective controllers 126 such that, e.g., each controller 126 includes a buffer 130.

The DSP 118, in at least some embodiments, includes memory 124, such as static random-access memory (SRAM), and a multiplexer (MUX) (not shown). In other implementations, the MUX is implemented as a software audio component/plugin executed from DSP 118. The DSP 118 is configured to carry out digital signal processing algorithms (e.g., for audio processing). Examples of such algorithms include finite impulse response (FIR) filtering algorithms, and so forth. Typically, a DSP performs such algorithms more efficiently (e.g., faster, and/or using less power) than a CPU or other processor in a computing system. Accordingly, in some implementations, a host OS (not shown) implemented on the processing system 100, transfers data to the DSP 118 to perform such calculations, and retrieves or receives the results after the DSP 118 has completed the calculations. The DSP 118 includes firmware running on the audio co-processor 110 and one or more ring buffers (i.e., circular buffers), which are implemented in the DSP memory 124 in this example or are implemented in other hardware in other implementations. The DSP memory 124 is a working memory for DSP 118.

Each of the I2S controllers 126, in at least some implementations, includes a direct memory access (DMA) controller/engine 128. It should be understood that additional components of the I2S controllers 126 have been omitted for clarity and ease of description. In at least some implementations, each I2S controller 126 has three main signals/lines including a continuous serial clock (SCLK, SCK, or BCLK) signal, a word select (WS or LRCLK) signal, and a serial data line (SD) signal. In some embodiments, each I2S controller 126 uses its DMA engine 128 to fetch audio data from any of a number of audio data sources in the processing system. For example, in some embodiments, the DMA engines 128 fetch audio data from the ACP memory 122, from the DSP memory 124, or from system memory 108 based on commands issued by the respective I2S controllers 126. Each I2S controller 126 includes a buffer (not shown) that is filled by the DMA engine 128 associated with the I2S controller 126.

The hardware synchronizer 120, at least in some implementations, includes circuitry for monitoring signals received from the I2S controllers 126 and initiating synchronized transmission of audio data from at least a subset of the I2S controllers 126. As described in greater detail below, the hardware synchronizer 120 is configured to coordinate synchronized streaming of audio data from the multiple I2S controllers 126 to one or more audio endpoints (not shown) via one or more audio codecs 112 (e.g., a digital-to-analog converter (DAC)) of each audio endpoint. In response to the buffer of each I2S controller 126 (or at least a predetermined subset of the I2S controllers 126) being filled to a predetermined level, the hardware synchronizer 120 enables streaming of the audio data from the I2S controllers 126 to the one or more audio codecs 112.

Figure 2:
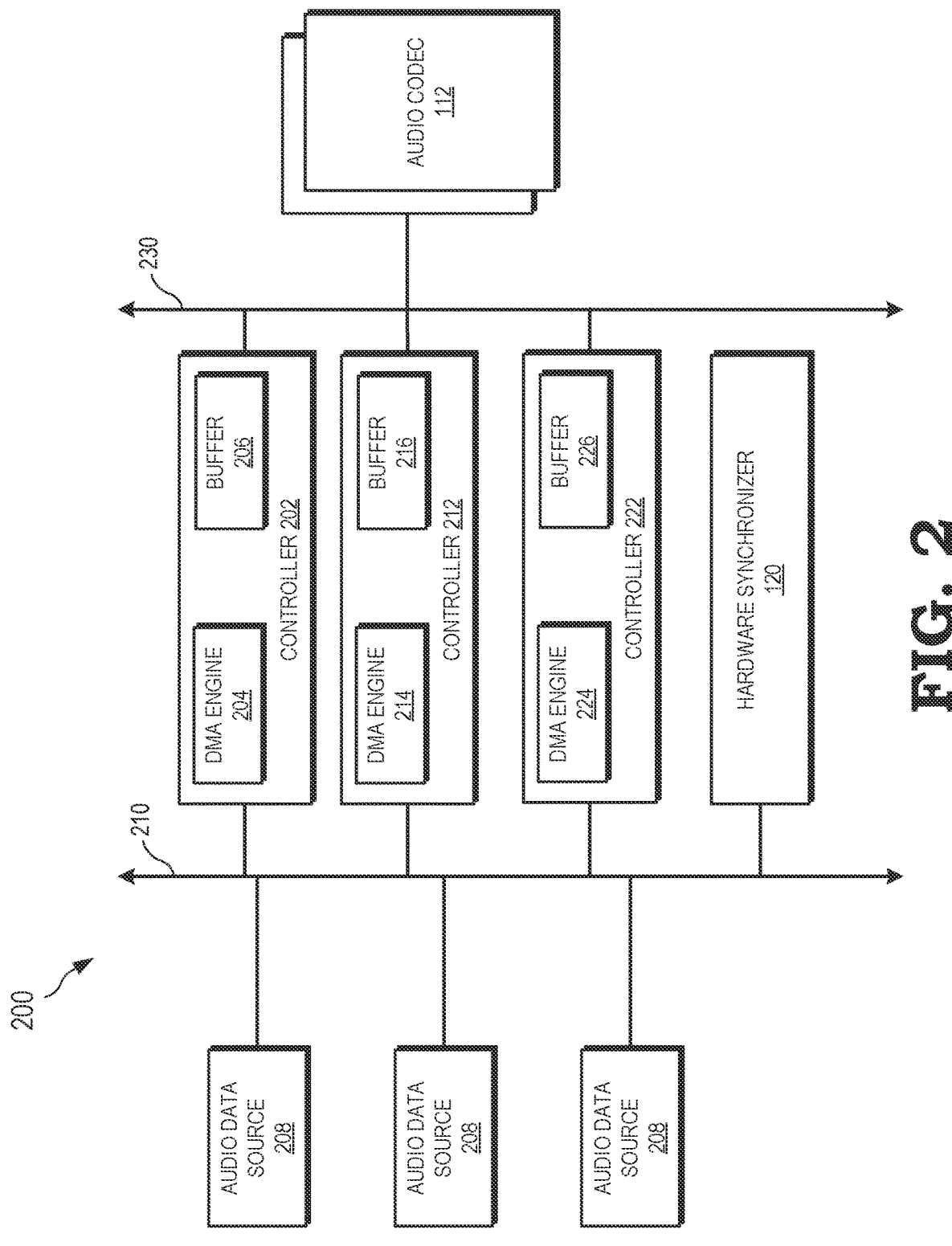
FIG. 2 is a block diagram of the hardware synchronizer synchronizing audio data streams from multiple controllers to one or more audio codecs in response to buffers associated with the controllers being full or filled to a predetermined level in accordance with some embodiments.

FIG. 2 is a block diagram of a portion 200 of the processing system 100 illustrating the hardware synchronizer initiating synchronized audio data transmission from multiple controllers 202, 212, 222 to one or more audio codecs 112 in response to buffers associated with the controllers being filled to the predetermined level in accordance with some embodiments. In this example, each of the controllers 202, 212, 222 is an I2S controller configured to operate in a TDM mode in which the I2S controllers transmit audio data for multiple audio streams on a single channel to each of the one or more audio codecs 112.

Each controller includes a DMA engine and a buffer. For example, controller 202 includes DMA engine 204 and buffer 206; controller 212 includes DMA engine 214 and buffer 216; and controller 222 includes DMA engine 224 and buffer 226. Each of the DMA engines 204, 214, 224 fetches audio data from one or more audio data sources 208 via an interconnect 210 to their respective controllers 202, 212, 222. The controllers 202, 212, 222 store the audio data at their respective buffers 206, 216, 226. Because the DMA engines 204, 214, 224 perform data fetching asynchronously from each other, the buffers 206, 216, 226 fill at different rates.

In some embodiments, when each buffer 206, 216, 226 is full or filled to a predetermined level, the controller associated with the buffer signals the hardware synchronizer 120 that its buffer is full. Thus, for example, when the buffer 206 is full, the controller 202 signals to the hardware synchronizer 120 an indication that the buffer 206 is full. Likewise, when the buffer 216 is full, the controller 212 sends an indication to the hardware synchronizer 120 that the buffer 216 is full, and when the buffer 226 is full, the controller 222 sends an indication to the hardware synchronizer 120 that the buffer 226 is filled to a predetermined level. In some embodiments, the predetermined level is completely filled, and in other embodiments, the predetermined level is less than completely filled. In response to receiving the indications from each of the controllers 202, 212, 222 that their respective buffers 206, 216, 226 are full, the hardware synchronizer 120 initiates the synchronized transmission of the audio data from each of the controllers 202, 212, 222 to the one or more audio codecs 112. In some embodiments, the controllers 202, 212, 222 transmit the audio data to the one or more audio codecs 112 substantially simultaneously via a link 230.

Figure 3:
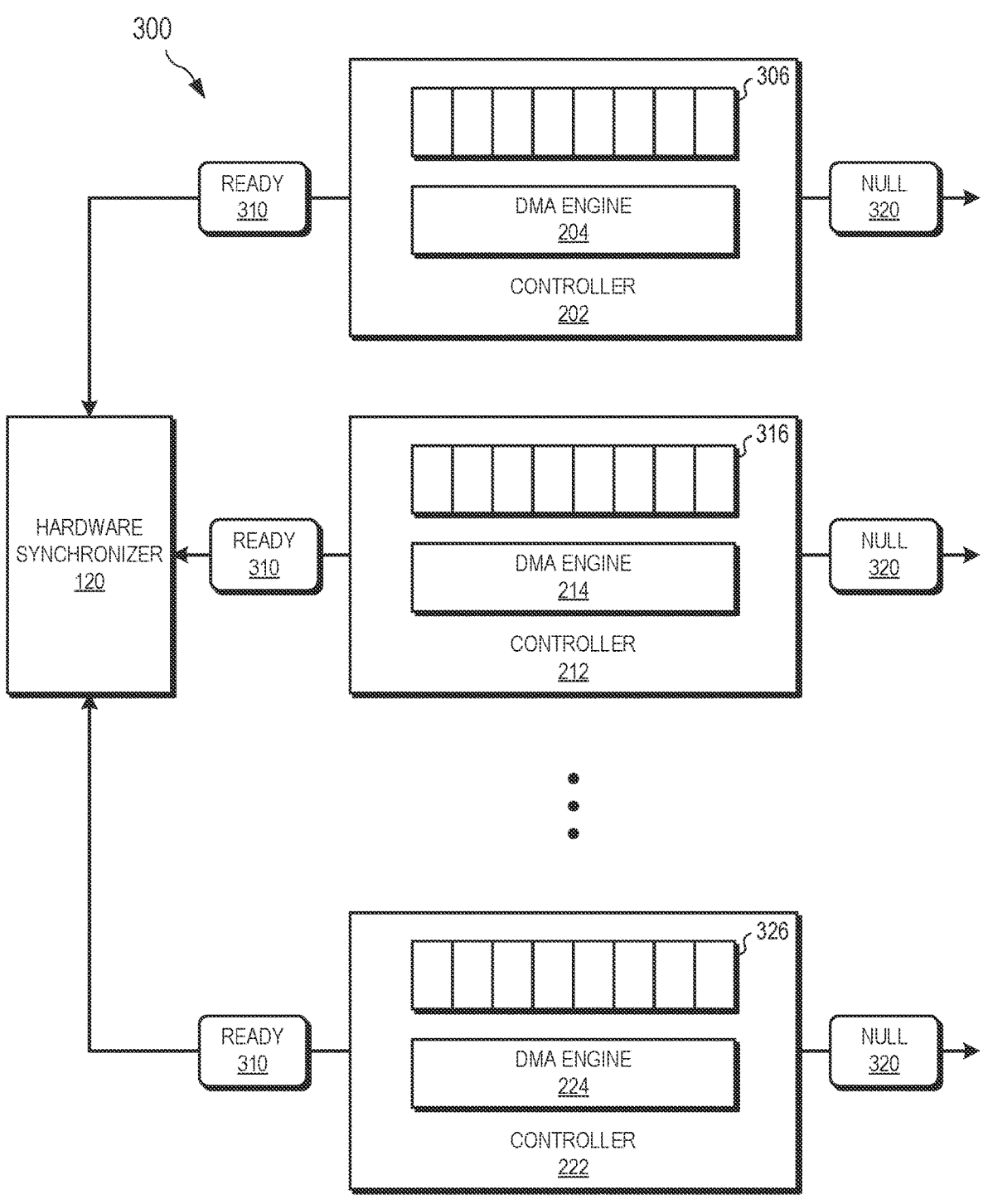
FIG. 3 is a block diagram illustrating multiple controllers of an audio processing system signaling to the hardware synchronizer that a buffer associated with each controller is full in accordance with some embodiments.

FIG. 3 is a block diagram of a portion 300 of the processing system 100 illustrating multiple controllers of an audio processing system signaling to the hardware synchronizer 120 that a buffer associated with each controller is full in accordance with some embodiments. In the illustrated example, each controller 202, 212, 222 includes a buffer that is implemented as a first-in-first-out (FIFO) buffer. In particular, controller 202 is associated with FIFO 306, controller 212 is associated with FIFO 316, and controller 222 is associated with FIFO 326.

The DMA engines 204, 214, 224 associated with each of the controllers 202, 212, 222 fetch audio data on behalf of their respective controllers and store the audio data at each of the respective FIFOs 306, 316, 326. When the FIFO 306 is filled to a predetermined level, the controller 202 sends an indication (e.g., ready signal 310) to the hardware synchronizer 120. Similarly, when the FIFO 316 is filled to a predetermined level, the controller 212 sends a ready signal 310 to the hardware synchronizer 120, and when the FIFO 326 is filled to a predetermined level, the controller 222 sends a ready signal 310 to the hardware synchronizer 120. Once the hardware synchronizer 120 has received the ready signals 310 from each of the controllers 202, 212, 222, the hardware synchronizer initiates streaming of the audio data from the controllers 202, 212, 222 to the one or more audio codecs 112. For example, in some embodiments, the hardware synchronizer 120 initiates synchronized streaming of audio data by sending a sync signal (not shown) to each of the controllers 202, 212, 222, in response to which the controllers 202, 212, 222 begin transmitting the audio data in unison. Until all of the FIFOs 306, 316, 326 are filled to predetermined levels and the hardware synchronizer 120 sends the sync signal, each of the controllers 202, 212, 222 streams null data 320 to the one or more audio codecs 112 in some embodiments. In other embodiments, the controllers 202, 212, 222 do not send any data until all of the FIFOs 306, 316, 326 are filled to predetermined levels and the hardware synchronizer 120 send the sync signal.

Figure 4:
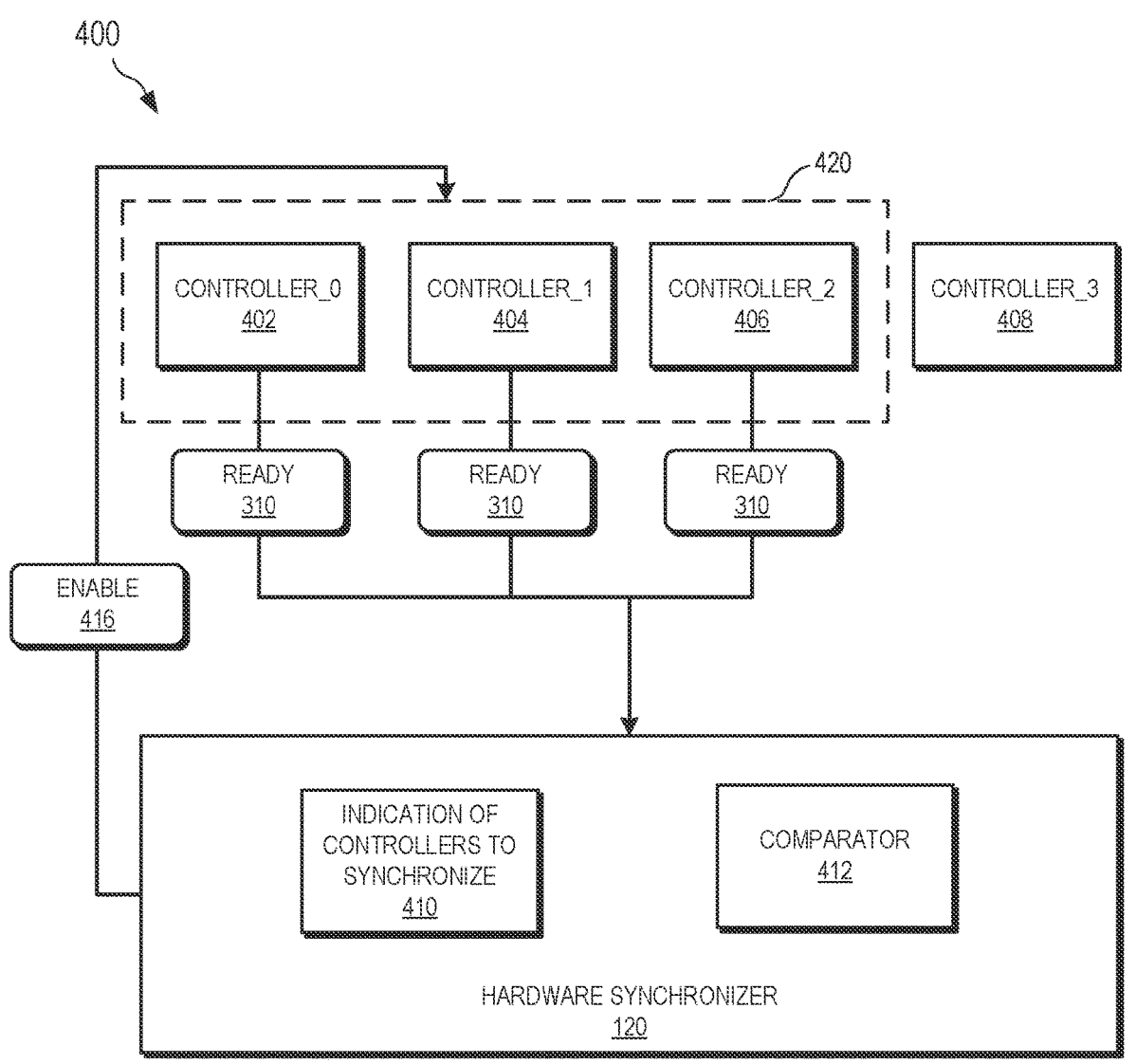
FIG. 4 is a block diagram of the hardware synchronizer enabling streaming of audio data from a predetermined subset of controllers to one or more codecs in response to each of the controllers of the subset signaling that the buffer associated with each controller is full in accordance with some embodiments.

FIG. 4 is a block diagram 400 illustrating the hardware synchronizer 120 enabling streaming of audio data from a predetermined subset 420 of controllers of the processing system 100 to the one or more audio codecs 112 in response to each of the controllers of the subset 420 signaling that the buffer associated with each controller is filled to a predetermined level in accordance with some embodiments. In the illustrated example, the processing system 100 includes four controllers: controller_0 402, controller_1 404, controller_2 406, and controller_3 408. The hardware synchronizer 120 has been programmed with an indication 410 of the subset 420 of controllers to synchronize indicating that the hardware synchronizer 120 is to synchronize transmission of audio data from a subset 420 of the controllers that includes controller_0 402, controller_1 404, and controller_2 406. In some embodiments, the indication 410 of the subset 420 of controllers to synchronize is programmed as follows:

0×0 indicates no synchronization between controllers.

0×F indicates controller_0 402, controller_1 404, controller_2 406, and controller_3 408 are to be synchronized.

0×7 indicates controller_0 402, controller_1 404, and controller_2 406 are to be synchronized.

0×3 indicates controller_0 402 and controller_1 404 are to be synchronized.

0×5 indicates controller_0 402 and controller_2 406 are to be synchronized.

0×6 indicates controller_1 404 and controller_2 406 are to be synchronized.

When the buffer associated with each controller is full, the controller transmits a ready signal 310 to the hardware synchronizer 120 indicating that its buffer is filled to the predetermined level. The hardware synchronizer 120 includes a comparator 412 that includes circuitry configured to compare the received ready signals 310 to the indication 410 of the subset 420 of controllers to synchronize. In response to receiving a signal from each of the controllers of the subset 420 indicating that the buffer associated with each controller of the subset 420 is filled to the predetermined level (e.g., ready signal 310), the hardware synchronizer 120 sends an enable signal 416 to the controllers of the subset 420 to initiate streaming of audio data to the one or more audio codecs 112.

In the illustrated example, the indication 410 of the subset 420 of controllers to synchronize is 0×7, such that the subset 420 includes controller_0 402, controller_1 404, and controller_2 406 and excludes controller_3 408. When the buffers associated with each of controller_0 402, controller_1 404, and controller_2 406 are filled to the predetermined levels, each of controller_0 402, controller_1 404, and controller_2 406 transmits a ready signal 310 to the hardware synchronizer 120. The comparator 412 compares the controllers from which ready signals 310 are received to the indication 410 of the subset 420 of controllers to synchronize. In response to determining that a ready signal 310 has been received from every controller of the subset 420 identified by the indication 410 (i.e., from controller_0 402, controller_1 404, and controller_2 406), the hardware synchronizer 120 transmits the enable signal 416 to each of controller_0 402, controller_1 404, and controller_2 406. In some embodiments, transmitting the enable signal 416 includes writing a sync enable signal to the LRCLK register of each controller of the subset 420.

FIG. 5 is a flow diagram illustrating a method 500 for synchronizing transmission of audio data from multiple controllers to one or more audio codecs in accordance with some embodiments. In some embodiments, the method 500 is performed by a processing system such as processing system 100.

At block 502, each of the controllers 126 of the processing system 100 streams null (mute) data to the one or more audio codecs 112. The controllers 126 continue transmitting mute data to the one or more audio codecs 112 until they are enabled to transmit audio data. By transmitting mute data to the one or more audio codecs 112, the controllers 126 produce silence pending the synchronous transmission of audio data.

At block 504, each of the controllers 126 sends commands to its associated DMA engine 128 to fetch audio data. The DMA engines 128 fetch audio data asynchronously from each other in response to the commands. The audio data may be fetched from any of a number of memory and cache locations in the processing system 100, including DSP memory 124, ACP memory 122, and system memory 108. At block 506, the DMA engines 128 store the audio data in buffers 206, 216, 226 associated with each of the controllers. In some embodiments, the buffers 206, 216, 226 are implemented as FIFOs 306, 316, 326 that fill at different rates due to the asynchronous fetching by the DMA engines 128.

At block 508, each controller determines whether its associated buffer is filled to a predetermined level. If, at block 508, a controller determines that its associated buffer is not filled to the predetermined level, the method flow returns to block 504 and the DMA engine 128 for the controller continues fetching audio data and storing the audio data to the buffer.

If, at block 508, the controller determines that its buffer is filled to the predetermined level, the method flow continues to block 510. At block 510, the controller sends a ready signal 310 to the hardware synchronizer 120. At block 512, the hardware synchronizer 120 determines whether ready signals 310 have been received from all controllers that are intended to transmit synchronized audio data to the one or more audio codecs 112. For example, in some embodiments, the hardware synchronizer 120 compares the controllers from which ready signals 310 have been received to an indication 410 of a subset 420 of controllers to synchronize.

If, at block 512, the hardware synchronizer 120 determines that a ready signal 310 has not yet been received from all of the controllers of the subset 420, the method flow continues back to block 504, and the controllers continue to transmit mute data to the one or more audio codecs 112 while the DMA engine(s) 128 for the controllers with unfilled buffers continue fetching audio data. In some implementations, the controllers do not transmit any data until the hardware synchronizer 120 determines that a ready signal 310 has been received from all of the controllers of the subset 420. If, at block 512, the hardware synchronizer 120 determines that a ready signal 310 has been received from all of the controllers of the subset 420, the method flow continues to block 514. At block 514, the hardware synchronizer 120 initiates synchronized transmission of audio data from the subset 420 of controllers to the one or more audio codecs 112. In some embodiments, the subset 420 of controllers includes all of the controllers of the processing system 100, and in other embodiments the subset 420 includes fewer than all of the controllers of the processing system 100.

In some embodiments, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

One or more of the elements described above is circuitry designed and configured to perform the corresponding operations described above. Such circuitry, in at least some embodiments, is any one of, or a combination of, a hard-coded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some embodiments, the circuitry for a particular element is selected, arranged, and configured by one or more computer-implemented design tools. For example, in some embodiments the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components," "units," "devices," "circuitry", etc.) are described or claimed as "configured" to perform one or more tasks or operations. This formulation—[entity] configured to [perform one or more tasks]—is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving audio data at a plurality of controllers of an audio system;
storing the audio data at a plurality of buffers, each buffer of the plurality of buffers associated with a controller of the plurality of controllers; and
initiating synchronized transmission of the audio data from each controller to one or more codecs in response to the plurality of buffers being filled to a predetermined level.

2. The method of claim 1, further comprising:
fetching the audio data to each controller of the plurality of controllers using a direct memory access engine associated with each controller.

3. The method of claim 2, wherein fetching the audio data to each of controller of the plurality of controllers is performed asynchronously.

4. The method of claim 1, further comprising:

sending a signal from each controller that the buffer associated with the controller is filled to the predetermined level.

5. The method of claim 4, wherein initiating synchronized transmission is further in response to receiving the signal from each controller of the plurality of controllers.

6. The method of claim 1, wherein the plurality of controllers is a subset of controllers of the audio system.

7. The method of claim 1, further comprising:

transmitting null data from each controller to the one or more codecs prior to initiating synchronized transmission of the audio data.

8. An audio system, comprising:

a plurality of controllers, each controller configured to receive audio data and store the audio data at a buffer associated with the controller;

one or more codecs configured to receive the audio data from the plurality of controllers; and a hardware synchronizer configured to initiate synchronized transmission of the audio data from the plurality of controllers to the one or more codecs in response to the buffer associated with each controller being filled to a predetermined level.

9. The audio system of claim 8, wherein each controller of the plurality of controllers is associated with a direct memory access (DMA) engine configured to fetch the audio data to each controller.

10. The audio system of claim 9, wherein each DMA engine is configured to fetch the audio data asynchronously from the other DMA engines.

11. The audio system of claim 8, wherein each controller is configured to send a signal to the hardware synchronizer indicating that the buffer associated with the controller is filled to the predetermined level.

12. The audio system of claim 11, wherein the hardware synchronizer is further configured to initiate synchronized transmission in response to receiving the signal from each controller of the plurality of controllers.

13. The audio system of claim 8, wherein the plurality of controllers is a subset of controllers of the audio system.

14. The audio system of claim 8, wherein each of the plurality of controllers is further configured to transmit null data to the one or more codecs prior to the synchronized transmission of the audio data.

15. A system, comprising:

a plurality of buffers, each buffer associated with a controller of a plurality of controllers and configured to receive audio data; and a hardware synchronizer configured to initiate synchronized transmission of the audio data from at least a subset of the plurality of controllers to one or more codecs in response to the plurality of buffers being filled to a predetermined level.

16. The system of claim 15, wherein each controller of the plurality of controllers is associated with a direct memory access (DMA) engine configured to fetch the audio data to each controller.

17. The system of claim 16, wherein each DMA engine is configured to fetch the audio data asynchronously from the other DMA engines.

18. The system of claim 15, wherein each controller is configured to send a signal to the hardware synchronizer indicating that the buffer associated with the controller is filled to the predetermined level.

19. The system of claim 18, wherein the hardware synchronizer is further configured to initiate synchronized transmission in response to receiving the signal from each controller of the plurality of controllers.

20. The system of claim 15, wherein each of the plurality of controllers is further configured to transmit null data to the one or more codecs prior to the synchronized transmission of the audio data.

\* \* \* \* \*